(12) United States Patent
Makinen et al.

(10) Patent No.: US 11,647,432 B2
(45) Date of Patent: *May 9, 2023

(54) ANCHOR RELOCATION

(71) Applicant: NOKIA TECHNOLOGIES OY, Espoo (FI)

(72) Inventors: Jarmo Tapani Makinen, Espoo (FI); Amaanat Ali, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,794

(22) Filed: Jan. 25, 2022

(65) Prior Publication Data

US 2022/0150771 A1   May 12, 2022

Related U.S. Application Data

(63) Continuation of application No. 16/343,878, filed as application No. PCT/EP2017/077146 on Oct. 24, 2017, now Pat. No. 11,265,775.

(30) Foreign Application Priority Data

Oct. 25, 2016   (IN) .............................. 201611036469

(51) Int. Cl.
*H04W 36/00*     (2009.01)
*H04W 76/15*     (2018.01)
(Continued)

(52) U.S. Cl.
CPC ....... *H04W 36/0069* (2018.08); *H04L 5/0035* (2013.01); *H04W 36/305* (2018.08);
(Continued)

(58) Field of Classification Search
CPC ........... H04W 36/0069; H04W 36/305; H04W 36/38; H04W 76/15; H04W 88/14; H04L 5/0035
See application file for complete search history.

(56) References Cited

U.S. PATENT DOCUMENTS

2006/0146875 A1   7/2006 Yang
2010/0067483 A1   3/2010 Ahluwalia
(Continued)

FOREIGN PATENT DOCUMENTS

CN   102711202 A   10/2012
CN   104471981 A    3/2015
(Continued)

OTHER PUBLICATIONS

Chinese Office Action corresponding to CN Application No. 201780074778.9, dated Dec. 15, 2021.
(Continued)

*Primary Examiner* — Jackie Zuniga Abad
(74) *Attorney, Agent, or Firm* — Squire Patton Boggs (US) LLP (57) ABSTRACT

It is provided a method, comprising supervising if a request to provide user plane connectivity for a user equipment via a second connection through a second anchor entity is received and if the user plane connectivity for the user equipment is provided via a first connection through a first anchor entity, wherein the first anchor entity and the second anchor entity are differently identified; creating the second connection if the request is received; inhibiting transmitting of user plane data on the second connection from creating the second connection until a predefined event happens if the user plane connectivity for the user equipment is provided via the first connection.

10 Claims, 5 Drawing Sheets

(51) Int. Cl.
*H04W 36/30* (2009.01)
*H04L 5/00* (2006.01)
*H04W 36/38* (2009.01)
*H04W 88/14* (2009.01)

(52) U.S. Cl.
CPC .......... *H04W 36/38* (2013.01); *H04W 76/15* (2018.02); *H04W 88/14* (2013.01)

(56) References Cited

U.S. PATENT DOCUMENTS

| | | |
|---|---|---|
| 2015/0049707 A1 | 2/2015 | Vajapeyam et al. |
| 2016/0057198 A1 | 2/2016 | Rezvani et al. |
| 2016/0249259 A1* | 8/2016 | Park .................. H04W 36/0058 |
| 2016/0373975 A1 | 12/2016 | Xu et al. |
| 2017/0289879 A1 | 10/2017 | Wang et al. |
| 2019/0268811 A1 | 8/2019 | Makinen et al. |

FOREIGN PATENT DOCUMENTS

| | | |
|---|---|---|
| CN | 104812008 A | 7/2015 |
| WO | 2014/013291 A1 | 1/2014 |
| WO | 2015/115761 A1 | 8/2015 |
| WO | 2018/077867 A1 | 5/2018 |

OTHER PUBLICATIONS

Indian Office Action corresponding to IN Application No. 201611036469, dated Jul. 30, 2021. No copy provided, per MPEP 609. Copy submitted in parent U.S. Appl. No. 16/343,878.

European Communication pursuant to Article 94(3) EPC, corresponding to EP Application No. 17 788 224.8, dated Jan. 11, 2021. No copy provided, per MPEP 609. Copy submitted in parent U.S. Appl. No. 16/343,878.

International Search Report & Written Opinion dated Jan. 22, 2018, corresponding to International Patent Application No. PCT/EP2017/077146. No copy provided, per MPEP 609. Copy submitted in parent U.S. Appl. No. 16/343,878.

European Communication pursuant to Article 94(3) EPC, corresponding to EP Application No. 17 788 224.8, dated Jan. 28, 2022.

* cited by examiner

ANCHOR RELOCATION

CROSS REFERENCE TO RELATED APPLICATION

This application is a Continuation of co-pending U.S. patent application Ser. No. 16/343,878, filed on Apr. 22, 2019, which is the National Stage of PCT International Application No. PCT/EP2017/077146, filed on Oct. 24, 2017, which claims priority to Indian Application No. 201611036469, filed on Oct. 25, 2016. The entire content of the above-referenced applications is hereby incorporated by reference.

FIELD OF THE INVENTION

The present invention relates to an apparatus, a method, and a computer program product related to a mobile communication networks. More particularly, the present invention relates to an apparatus, a method, and a computer program product of a mobile network providing user plane connectivity to a packet data network via a gateway and an anchor.

ABBREVIATIONS

3GPP Third Generation Partnership Project
5G $5^{th}$ Generation
AP Access Point
COTS Commercially Off-The-Shelf
CP Control Plane
DC Dual Connectivity in LTE
DRNC Drift RNC
eNB evolved NodeB
EPC Evolved Packet Core
FE Front End
GPRS General Packet Radio System
GRE Generic Routing Encapsulation
GW Gateway
IP Internet Protocol
IT Information Technology
LTE Long Term Evolution
LTE-A LTE-Advanced
MeNB Master eNB
MME Mobility Management Entity
PDCP Packet Data Convergence Protocol
PDN Packet Data Network
PDU Packet Data Unit
PGW PDN GW
RAN Radio Access Network
RAT Radio Access Technology
RNC Radio Network Controller
SeNB Secondary eNB
SGW Serving GW
SGSN Serving GPRS Support Node
SRNC Serving RNC
UE User Equipment
UP User Plane

BACKGROUND OF THE INVENTION

In some mobile networks (e.g. 5G networks), the UE can communicate with more than one access point at a time (multi-connectivity via plural radio links).

When the UE is connected to the network with a multi-connectivity session, it is connected to the multi-connectivity anchor point (anchor entity) via more than one access point. An anchor point is the point where the different user plane data paths are split in the radio access network, when seen from the PDN to which a gateway (such as a PGW) provides connectivity. In LTE Dual Connectivity this user plane RAN anchor is in the PDCP. In 5G it is planned to be in PDCP as well. Besides multi-connectivity anchoring, PDCP also typically contains functions like packet sequence numbering (essential for multi-connectivity) and reordering, packet header compression (ROHC) and ciphering. PDCP may be located within one of the base stations (always in LTE, according to current standards) or in some 5G cases it may be located in a separate node. In some cases, the anchor serves only a part of the traffic of one UE, namely a particular Radio Bearer of the UE.

That is, the gateway is the point of exit and entry of traffic for the UE to from the PDN (e.g. the internet). A UE may have simultaneous connectivity with more than one PDN GW for accessing multiple PDNs. The gateway may perform policy enforcement, packet filtering for each user, charging support, lawful Interception and/or packet screening. Mobility is anchored at the gateway only during the path switch phase of single connectivity handovers and during multi-connectivity anchor relocation. The anchor routes and forwards user plane data packets, while also acting as the mobility anchor for the user plane during inter-eNB handovers and as the anchor for mobility between different radio links. For example, the different radio links may belong to a same RAT, or they may belong to different RATs such as LTE or LTE-A and other 3GPP technologies. An access point is specific for the respective RAT. E.g., for LTE and LTE-A, the access point may be a NodeB and eNodeB, respectively. The functionality of a mobility anchor means that the anchor is not changed even if the UE moves within the network such that radio links to the UE may change, unless a relocation of the anchor function takes place.

These separate connections between the UE and the anchor points are sometimes called links hereinafter and together the connections form a set of links. The links may be identified by the respective access points. Hence, a set of links corresponds to a set of access points. A link comprises a radio link between the UE and a respective access point and a connection between the access point and the anchor. The user traffic is transported using either one of the links within the set of links or by more than one link by sharing the load between them or by replicating the traffic to all links in order to increase reliability for latency critical traffic. Which links within the set of links are used can be changed without introducing interruptions in the service. Furthermore, this can be made much faster than ramping up and down connections (links) or making handovers in a traditional single connectivity case.

When the UE moves, there may be a need to add new links to the set and remove some others. In this way multi-connectivity can take care of the mobility of the UE. However, when the distance between the UE and the multi-connectivity anchor point grows, at some point it might be recommendable to optimize the route the user plane data travel from the gateway via the anchor point to the access points (and vice versa) that are used. This may be done by relocating the multi-connectivity anchor point to a new, potentially more optimal location, i.e. by selecting a new anchor point at a different location than the previous anchor point.

In this case, conventionally, the anchor counterpart in the UE may be used for the new anchor, too. The counterpart first communicates with the original anchor, until it receives instructions to stop. This can be e.g. in the form of an end of data mark received through user plane. Next the control plane will reconfigure the counterpart to communicate with a new anchor instance that has been ramped up in the new location. For example tunnel end points and security keys may need to be reconfigured. The new anchor has to be configured as well. This includes some parameters that need to be transferred from the old location, which takes time and introduces a short service interruption. An example of these is the status of sequence numbers. After both the new anchor and the counterpart have been configured, the counterpart starts to communicate with the new anchor.

The relocation of the multi-connectivity anchor point corresponds to handover, including "path switch", in LTE single connectivity. In path switch, the SGW switches the data path from the Source eNB (old location) to the Target eNB (new location). The process is initiated by the Source eNB starting to forward the user data to the Target eNB through the X2 connection, instead of delivering it to the UE. After the UE has successfully contacted the Target eNB, the SGW is informed to switch the data path from the source eNB to the Target eNB. From the time the Source eNB starts forwarding the data to the Target eNB, until the Target eNB has processed it and sent it to the UE, the UE is receiving nothing. Thus, there is an interruption in the service that is equal to at least the latency of the X2 connection. Actually all data that is forwarded between eNBs will experience extra latency, which can be interpreted as an interruption.

In LTE Dual Connectivity, the anchor relocation corresponds to a normal single connectivity handover between MeNBs. This entails a service interruption as described in the previous paragraph. Switching data between MeNB and SeNB corresponds to switching data between links in multi-connectivity case and doesn't introduce a break.

In 3G, the above mentioned problem exists during a SRNC relocation with Iu relocation. The SRNC needs to forward the pending data packets towards the DRNC via the Iur connection if available or all the way through the SGSN creating the bottleneck mentioned above.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform at least supervising if a request to provide user plane connectivity for a user equipment via a second connection through a second anchor entity is received and if the user plane connectivity for the user equipment is provided via a first connection through a first anchor entity, wherein the first anchor entity and the second anchor entity are differently identified; creating the second connection if the request is received; inhibiting transmitting of user plane data on the second connection from creating the second connection until a predefined event happens if the user plane connectivity for the user equipment is provided via the first connection.

The at least one memory and the computer program code may be arranged to cause the apparatus to further perform checking if the predefined event happens; ceasing the inhibiting of the transmitting of the user plane data on the second connection if the predefined event happens; inhibiting transmitting the user plane data on the first connection if the predefined event happens.

The predefined event may be at least one of
a lapse of a first predefined time after the request was received;
a lapse of a second predefined time after the second connection was created;
receipt of an indication that the user plane connectivity is provided on the second connection;
receiving a first instruction to transmit user plane data via the second connection;
receiving a second instruction not to transmit the user plane data via the first connection; and
receiving uplink user plane data via the second connection.

The at least one memory and the computer program code may be arranged to cause the apparatus to further perform providing the user plane connectivity for the user equipment via the first connection at least until the predefined event happens.

The at least one memory and the computer program code may be arranged to cause the apparatus to further perform indicating to the user equipment, if the predefined event happens, that the user plane data are transmitted via the second connection.

The at least one memory and the computer program code may be arranged to cause the apparatus to further perform numbering packet data units of the user plane data transmitted to the user equipment on the first connection subsequently; numbering packet data units of the user plane data transmitted to the user equipment on the second connection subsequently and such that a first packet data unit of the user plane data transmitted on the second connection after the transmitting on the first connection is inhibited is a direct successor of a last packet data unit of the user plane data transmitted on the first connection before the transmitting on the first connection is inhibited.

The at least one memory and the computer program code may be arranged to cause the apparatus to further perform tearing down the first connection at a time when the transmitting of the user plane data on the first connection is inhibited.

According to a second aspect of the invention, there is provided an apparatus, comprising at least one processor, at least one memory including computer program code, and the at least one processor, with the at least one memory and the computer program code, being arranged to cause the apparatus to at least perform at least supervising if a request to host a second anchor counterpart is received and if a first anchor counterpart for providing user plane connectivity via a first anchor entity is hosted, the second anchor counterpart is for providing the user plane connectivity via a second anchor entity, and the first anchor identity is identified differently from the second anchor identity; creating the second anchor counterpart if the request is received; inhibiting transmitting user plane data through the second anchor counterpart from the creating of the second anchor counterpart until a predefined event happens if the first anchor counterpart is hosted.

The at least one memory and the computer program code may be arranged to cause the apparatus to further perform checking if the predefined event happens; ceasing the inhibiting of the transmitting of the user plane data through the second anchor counterpart if the predefined event happens; inhibiting transmitting the user plane data through the first anchor counterpart if the predefined event happens.

The predefined event may be at least one of
a lapse of a first predefined time after the request was received;
a lapse of a second predefined time after the second anchor counterpart was created.
receiving a first instruction to provide the user plane connectivity via the second anchor counterpart;
receiving a second instruction not to provide the user plane connectivity via the first anchor counterpart; and
receiving downlink user plane data via the second anchor counterpart; and
receiving an instruction to tear down the first anchor counterpart.

The at least one memory and the computer program code may be arranged to cause the apparatus to further perform maintaining the first anchor counterpart at least until the predefined event happens.

The at least one memory and the computer program code may be arranged to cause the apparatus to further perform removing the first anchor counterpart at a time when the transmitting of the user plane data via the first anchor counterpart is inhibited.

The at least one memory and the computer program code may be arranged to cause the apparatus to further perform providing the user plane connectivity via plural radio links through the first anchor counterpart before the transmitting of the user plane data through the first anchor counterpart is inhibited; and providing the user plane connectivity via the plural radio links through the second anchor counterpart when the transmitting of the user plane data through the first anchor counterpart is inhibited.

The at least one memory and the computer program code may be arranged to cause the apparatus to further perform numbering packet data units of the user plane data transmitted via the first anchor entity subsequently; numbering packet data units of the user plane data transmitted via the second anchor entity subsequently and such that a first packet data unit of the user plane data transmitted via the second anchor entity after the transmitting through the first anchor counterpart is inhibited is a direct successor of a last packet data unit of the user plane data transmitted the first anchor counterpart before the transmitting through the first anchor counterpart is inhibited.

According to a third aspect of the invention, there is provided a method, comprising supervising if a request to provide user plane connectivity for a user equipment via a second connection through a second anchor entity is received and if the user plane connectivity for the user equipment is provided via a first connection through a first anchor entity, wherein the first anchor entity and the second anchor entity are differently identified; creating the second connection if the request is received; inhibiting transmitting of user plane data on the second connection from creating the second connection until a predefined event happens if the user plane connectivity for the user equipment is provided via the first connection.

The method may further comprise checking if the predefined event happens; ceasing the inhibiting of the transmitting of the user plane data on the second connection if the predefined event happens; inhibiting transmitting the user plane data on the first connection if the predefined event happens.

The predefined event may be at least one of
a lapse of a first predefined time after the request was received;
a lapse of a second predefined time after the second connection was created;
receipt of an indication that the user plane connectivity is provided on the second connection;
receiving a first instruction to transmit user plane data via the second connection;
receiving a second instruction not to transmit the user plane data via the first connection; and
receiving uplink user plane data via the second connection.

The method may further comprise providing the user plane connectivity for the user equipment via the first connection at least until the predefined event happens.

The method may further comprise indicating to the user equipment, if the predefined event happens, that the user plane data are transmitted via the second connection.

The method may further comprise numbering packet data units of the user plane data transmitted to the user equipment on the first connection subsequently; numbering packet data units of the user plane data transmitted to the user equipment on the second connection subsequently and such that a first packet data unit of the user plane data transmitted on the second connection after the transmitting on the first connection is inhibited is a direct successor of a last packet data unit of the user plane data transmitted on the first connection before the transmitting on the first connection is inhibited.

The method may further comprise tearing down the first connection at a time when the transmitting of the user plane data on the first connection is inhibited.

According to a fourth aspect of the invention, there is provided a method, comprising supervising if a request to host a second anchor counterpart is received and if a first anchor counterpart for providing user plane connectivity via a first anchor entity is hosted, the second anchor counterpart is for providing the user plane connectivity via a second anchor entity, and the first anchor identity is identified differently from the second anchor identity; creating the second anchor counterpart if the request is received; inhibiting transmitting user plane data through the second anchor counterpart from the creating of the second anchor counterpart until a predefined event happens if the first anchor counterpart is hosted.

The method may further comprise checking if the predefined event happens; ceasing the inhibiting of the transmitting of the user plane data through the second anchor counterpart if the predefined event happens; inhibiting transmitting the user plane data through the first anchor counterpart if the predefined event happens.

The predefined event may be at least one of
a lapse of a first predefined time after the request was received;
a lapse of a second predefined time after the second anchor counterpart was created.
receiving a first instruction to provide the user plane connectivity via the second anchor counterpart;
receiving a second instruction not to provide the user plane connectivity via the first anchor counterpart; and
receiving downlink user plane data via the second anchor counterpart; and
receiving an instruction to tear down the first anchor counterpart.

The method may further comprise maintaining the first anchor counterpart at least until the predefined event happens.

The method may further comprise removing the first anchor counterpart at a time when the transmitting of the user plane data via the first anchor counterpart is inhibited.

The method may further comprise providing the user plane connectivity via plural radio links through the first anchor counterpart before the transmitting of the user plane data through the first anchor counterpart is inhibited; and providing the user plane connectivity via the plural radio links through the second anchor counterpart when the transmitting of the user plane data through the first anchor counterpart is inhibited.

The method may further comprise numbering packet data units of the user plane data transmitted via the first anchor entity subsequently; numbering packet data units of the user plane data transmitted via the second anchor entity subsequently and such that a first packet data unit of the user plane data transmitted via the second anchor entity after the transmitting through the first anchor counterpart is inhibited is a direct successor of a last packet data unit of the user plane data transmitted the first anchor counterpart before the transmitting through the first anchor counterpart is inhibited.

Each of the methods of the third and fourth aspects may be a method of anchor relocation.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:

Service break during anchor relocation may be avoided, not only in case of single-connectivity but even in a case of multi-connectivity. This may be particularly important for 5G low latency services;

An "end of data" mark may not be needed;

There may be no time critical process steps and no time critical parameter transfers;

A connection between the old anchor location and the new anchor location is not needed (e.g. for data or parameter transfer or for forwarding of acknowledgements).

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some embodiments of the invention provide a method how the multi-connectivity anchor point in the network can be moved to another location when the UE moves. When the location of the anchor point changes (i.e. an anchor point at a different location is selected), new connections from it to the gateway and to the access point in the set of links of the UE have to be created.

Figure 1:
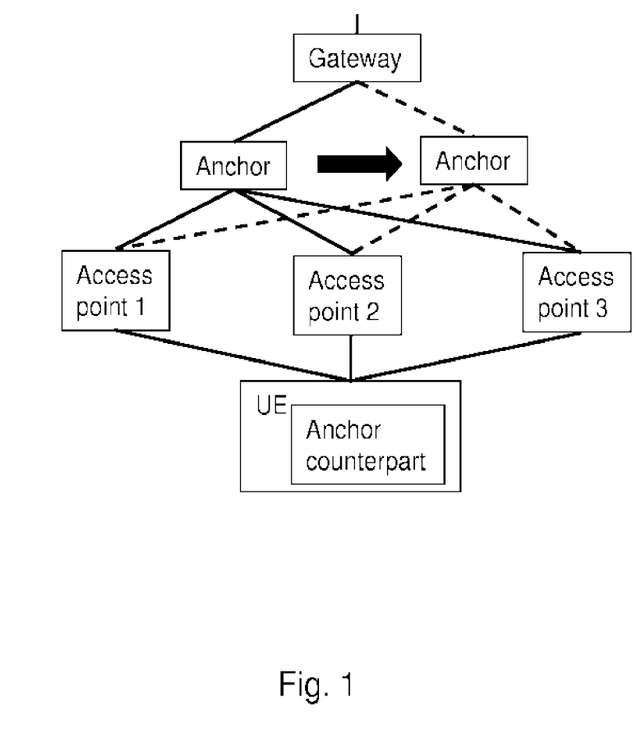
FIG. 1 shows a basic anchor relocation process.

Such a basic anchor relocation process is depicted in FIG. 1. Before the relocation, the gateway is connected via the left anchor and plural access points (in the Figure: Access points 1 to 3) to the UE. In the UE, an anchor counterpart takes care of the connection to the left anchor. All these connections may carry user plane data, as indicated by the solid lines.

If the anchor functionality is relocated to the right anchor in FIG. 1, new connections have to be set up between the right anchor and the gateway, and between the right anchor and the access points. Conventionally (e.g. 3G), the anchor counterpart in the UE may not be affected by the anchor relocation. The connections to the left anchor may be torn down after the relocation.

These operations may easily introduce a break in the service as explained in the following.

The different links in the set of links can have different latencies. Thus, the UE may receive the data units (the PDUs formed at the anchor location) in the wrong order, if they are coming via different links. To solve this, the anchor may attach a sequence number to the data units, so that the UE can re-order the data units, when needed. When the Anchor resumes operation in the new location, it has to be able to continue the sequence numbering from where it was left in the old location. It may have also need other parameters that depend on the ones used for the last data unit processed in the old location (e.g. ciphering). These parameters have to be transferred to the new location in a timely fashion.

More in detail, for a lossless session transfer the target (UE) is never sure which PDU sequence number was successfully transferred (because the procedure is not synchronized on the air interface). So the target would need to perform this synchronization using an explicit PDCP sequence number request check so that the PDUs can be retransmitted as such.

The gateway may execute the path switch by sending the last data packet (just before the path switch) to the anchor in the old location, by marking it with an "end of data mark" inserted to the data flow. In COTS IT equipment, the "end of data mark" feature is not provided but it may be a special feature in the gateway. When the Anchor in the old location gets the last packet and has processed it, the knowledge of the last data unit sequence number used by the anchor, and any other varying parameter, has to be transferred to the new location using the backhaul interface between the old anchor location and the new anchor location. Because the anchors have to ensure that the data delivery towards the radio interface is sequenced correctly, the anchor at the new location can start operation only after the anchor in the new location has received this information. The time taken for forwarding of data from the old location anchor to the new location anchor depends on the latency and bandwidth of the backhaul interface. For high data rate services the backhaul interface may easily be a bottleneck. Since the transfer of these parameters from the old location to the new location takes time, there will be an interruption/throughput reduction in the service. Some embodiments of the present invention remove this bottleneck.

Furthermore, when the UE is sending the acknowledgement of reception of the last downlink data unit, or when the UE is sending the last uplink data unit(s), it may send them to the old anchor location such that they have to be forwarded from there to the new location. Some embodiments of the invention avoid this forwarding.

Some embodiments of the invention provide a way how to relocate the multi-connectivity anchor without introducing an interruption in the service. According to these embodiments, there may be temporarily two multi-connectivity anchor points simultaneously operational (an "old" anchor point via which the user plane connectivity is provided before the relocation, and a "new" anchor point via which the user plane connectivity is provided after the relocation) for the UE in the network. Correspondingly, there are temporarily two anchor counterparts in the UE. The new anchor point in ramped up in the beginning of the relocation process and the old anchor may be torn down at the end of the process. Thus the gateway may switch the data path without any time criticality and a service interruption may be avoided. A special "end of data" mark is not needed to be inserted by the gateway. The two anchor points work completely independently such that parameters or data may not be forwarded from the old anchor point to the new anchor point.

Figure 2:
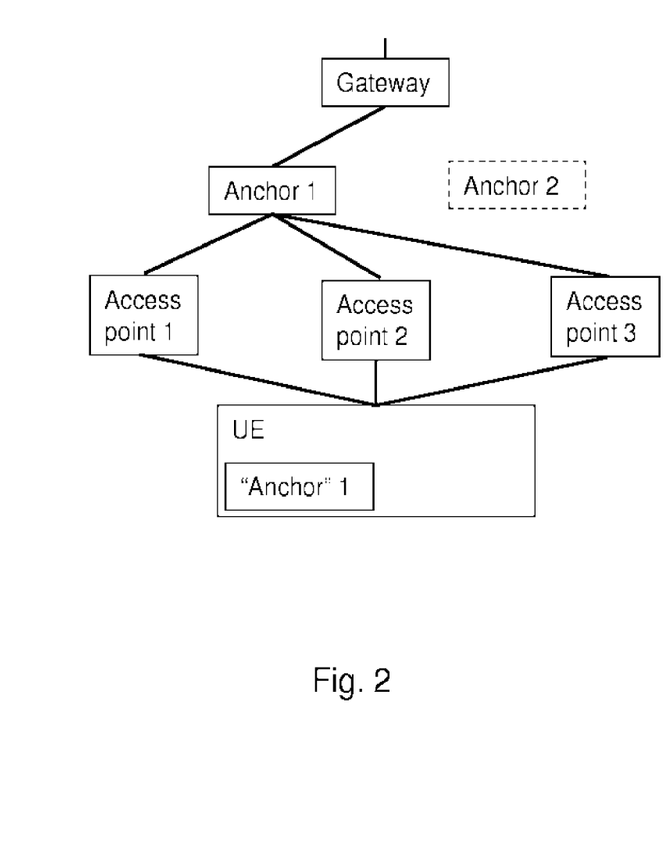
FIG. 2 shows a network before an anchor relocation process.

FIG. 2 shows a network before an anchor relocation process. The UE has an anchor counterpart 1 related to anchor 1. The UE is connected to Anchor 1 via plural links with respective access points (here: Access points 1 to 3). The access points may belong to same or different RATs. The access points are connected to Anchor 1, e.g. by fixed network lines, the internet, microwave, etc. Anchor 1 is connected to a Gateway providing connectivity to a PDN (not shown). Thus, the UE has user plane connectivity to the PDN via the Access points 1 to 3, Anchor 1, and the Gateway.

In addition, FIG. 2 shows Anchor 2. It is determined that Anchor 2 is located at a better location than Anchor 1, indicated by a dashed rectangle. Such determination may be made e.g. based on latency and/or load on the connections between the Access points, gateway and potential Anchor locations. That is, a relocation may be considered if one or both of latency and load of the old anchor location or respective backhaul connections exceed the ones of the new anchor location by a certain threshold. For example, the maximum load and/or the latencies in the uncongested state may be compared. Also, in some cases, Anchor 2 location may provide the anchor function for another UE via the same Access points 1 to 3. In this case, current latency and/or current load on the connections from the access points to the anchors may be compared. The better located anchor may be determined e.g. based on a (weighted) average of these values or based on the minimum of these values. As another option, the better located anchor may be determined based on geographical location of the UE and the anchors. The determination of the better located anchor is not limited to these examples. Any way to determine the better located anchor may be used.

Figure 3:
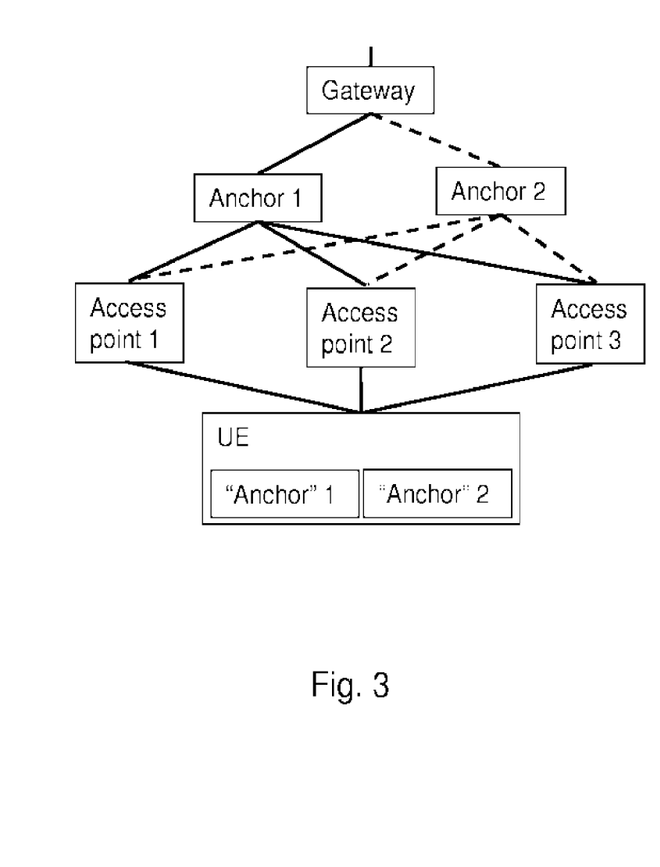
FIG. 3 shows the network in a preparation phase of an anchor relocation process according to some embodiments of the invention.

FIG. 3 shows the preparation phase of the anchor relocation. A new anchor instance (software instance) is created in the new location to serve as an anchor function for the UE. Herein, the new software instance is sometimes described as a network entity ("anchor entity", here: Anchor 2; Anchor 1 is another "anchor entity") which is solely related to the one UE under discussion. Connection between Anchor 2 and the gateway as well as connections between Anchor 2 and all the access points that are included in the set of links of the UE are created. For the time being, user plane data are not sent through the links to/from Anchor 2. This is indicated by dashed lines in FIG. 3. A counterpart related to Anchor 2 is also ramped up in the UE.

Meanwhile, if new access points are added to or removed from the set of links, the connections of both anchors are updated accordingly. That is, each access point of the set of links is connected to both Anchor 1 and Anchor 2.

After the preparation phase is finalized, the system is ready for switchover of the anchors. Namely, the gateway is instructed to switch the data path to the new anchor (Anchor 2). The instruction may be given by a control entity controlling the relocation process, such as a MME in LTE. The control entity may be or may not be located at the gateway.

For example, the control entity may start the switchover after it has received an instruction to provide the user plane connectivity via the second anchor entity or an instruction not to provide the user plane connectivity via the first anchor entity. The control entity may receive such instruction from an external entity such as a network management system supervising load and/or latency on the links.

In some embodiments, the switchover may take place if a predetermined event takes place. Such predetermined events may be e.g.:

Getting acknowledgements indicating that the setting up of the new connections and the ramp up of the second anchor counterpart in the UE is complete (i.e.: user plane connectivity is provided via the second anchor);

a lapse of a first predefined time after the request was received;

a lapse of a second predefined time after the second connection was created.

That is, the control entity may start the switchover e.g. based upon the completion of setting up the new connections, a timer, or based upon an instruction received from an external entity.

In some embodiments of the invention, the control entity may combine several or all of the above conditions by a logical operation (AND, OR, NOT, etc.). E.g., the control entity may start the switchover if an instruction from the external entity is received AND the first predetermined time after the receipt of the request to prepare anchor relocation is lapsed. In some embodiments of the invention, the control entity may start the switchover if one of the conditions is fulfilled.

Figure 4:
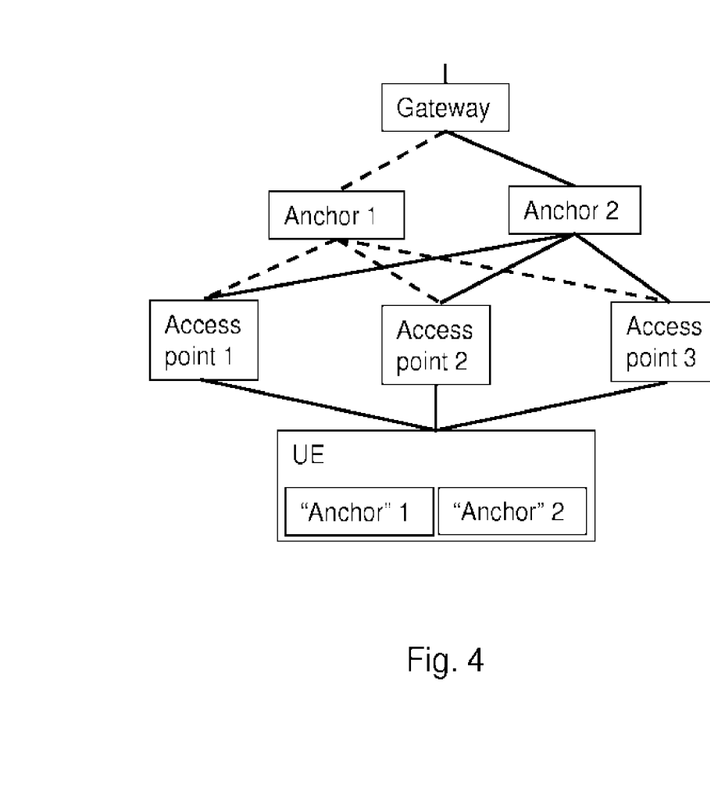
FIG. 4 shows the network after the switchover of the anchor relocation process according to some embodiments of the invention.

The result of the switchover is shown in FIG. 4. The gateway now sends user plane data to the UE via Anchor 2, and it does not send user plane data to the UE via Anchor 1 anymore (indicated by dashed lines in FIG. 4). Hence, the UE starts to get user plane data through the counterpart of Anchor 2 instead of the counterpart of Anchor 1. Since the new data path via Anchor 2 is shorter than the old one via Anchor 1, the UE may well receive the first user plane data packet through the new anchor counterpart earlier than the last one through the old anchor counterpart. The IP stack in the UE can handle this situation as a standard feature. However, if delivery in sequence through the mobile network is wanted, then the gateway can number the packets (an existing GRE option in standard gateways) and the UE can re-order them according to the numbers. Since both the old and the new anchor are operational simultaneously, the timing of the switchover is not critical and there is no interruption in the service.

Uplink operation corresponds to downlink operation. When the system is ready for switchover (new anchor ramped up with connections to set of access points and gateway; new anchor counterpart in UE ramped up), the UE may be informed or derive itself that switchover takes place. Namely, the UE may be informed by a control plane message on the switchover or directly by the external entity described above (e.g. network management system), which instructs the control entity to start switchover. As a further option, the UE may use a timer correspondingly to the timer used at the control entity of the gateway. As a still further option, the UE may derive that switchover (in downlink) took place when it receives downlink user plane data through counterpart of Anchor 2. As a still further option, the UE may derive that switchover took place, when it receives a control plane command to tear down the first anchor counterpart.

On the UE side (uplink), after the switchover the UE sends its user plane data through the counterpart of Anchor 2 and the set of links to Anchor 2 to the gateway. It does not send user plane data anymore through the counterpart of Anchor 1.

Switchover in uplink may be simultaneous to switchover in downlink (e.g., if the control entity informs UE on the switchover), or it may be at a different time. E.g., if the UE derives that switchover took place because it receives downlink user plane data through counterpart of Anchor 2, the switchover of the uplink is later than the switchover of the downlink. As another example, if the timers are not fully synchronized, the switchover of uplink may be earlier or later than the switchover of the downlink.

As described above, in some embodiments of the invention, switchover of uplink may be earlier than switchover of downlink. A still further example of such behavior is that the external entity only requests the switchover from the UE and not from the gateway. In such embodiments, the gateway may recognize that switchover of uplink took place when it receives uplink user plane data via Anchor 2. This may be another trigger for switchover of downlink.

In some embodiments of the invention, after the switchover has taken place for both uplink and downlink, and consequently Anchor 1 does not receive user plane data, both Anchor 1 and its counterpart in the UE may be ramped down. E.g. such ramp down may be started by the control entity after a predefined time after switchover (or after the predefined event triggering the switchover) has lapsed. This time should preferably be longer than the maximum time for the data to travel between the gateway and the UE via Anchor 1. In some embodiments of the invention, other conditions may apply to trigger tearing down of Anchor 1 and its anchor counterpart after the switchover. For example, they may be torn down (ramped down) if all data buffers in the links to Anchor 1 are reported empty, or if the transmitting end (in both directions) has received acknowledgements of successful delivery of all packets it has sent. As a further optional condition, tearing down of Anchor 1 and its anchor counterpart after the switchover may be triggered if a predefined time after the last transmission of data via Anchor 1 has lapsed. I.e., if user plane data were not transmitted for some time before switchover, Anchor 1 and it counterpart may be torn down immediately after the switchover.

In some embodiments of the invention, the control entity may combine several or all of the above conditions by a logical operation (AND, OR, NOT, etc.). E.g., the control entity may start the ramp down after the switchover if a predefined time has lapsed after the switchover AND all buffers are reported empty.

Figure 5:
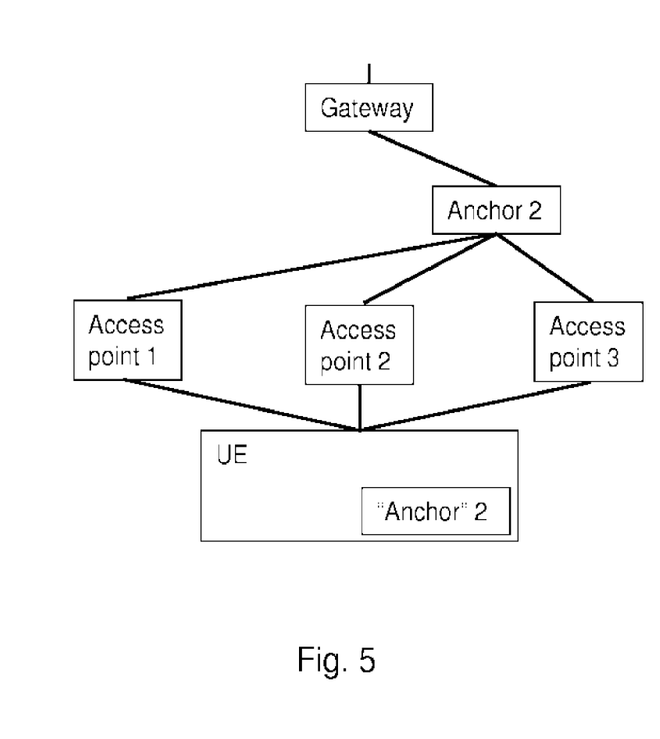
FIG. 5 shows the network after the anchor relocation process.

The result of the ramp down is shown in FIG. 5. FIG. 5 corresponds to FIG. 2, wherein Anchor 1 is replaced by Anchor 2 (and Anchor 1 is not indicated as a better located Anchor in FIG. 5).

Figure 6:
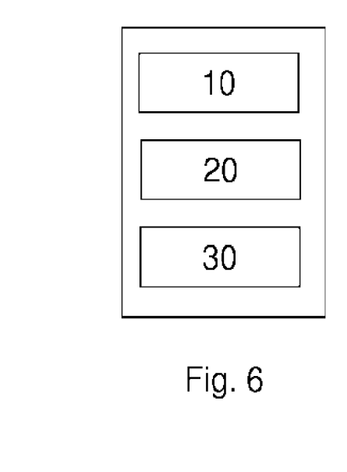
FIG. 6 shows an apparatus according to an embodiment of the invention.
Figure 7:
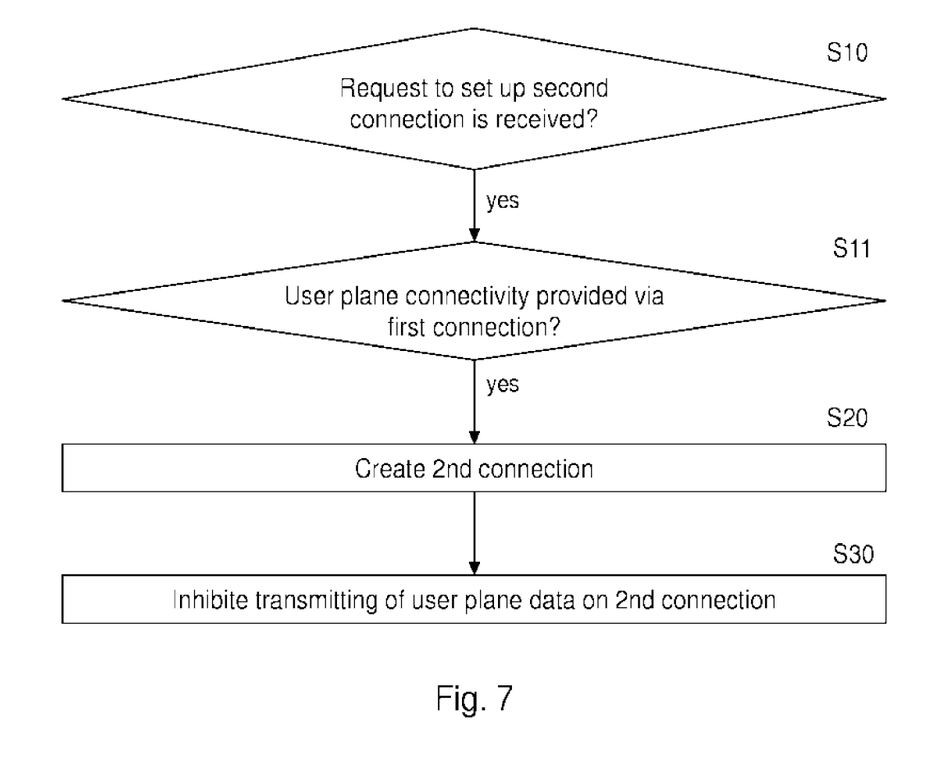
FIG. 7 shows a method according to an embodiment of the invention.

FIG. 6 shows an apparatus according to an embodiment of the invention. The apparatus may be a gateway or an element thereof such as a control entity. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises supervising means 10, creating means 20, and inhibiting means 30. The supervising means 10, creating means 20, and inhibiting means 30 may be a supervising processor, creating processor, and inhibiting processor, respectively.

The supervising means 10 supervises if a request to provide user plane connectivity for a user equipment via a second connection through a second anchor entity is received (S10). Furthermore, the supervising means 10 supervises if the request is received while the user plane connectivity for the user equipment is provided via a first connection through a first anchor entity (S11). The first anchor entity and the second anchor entity are differently identified.

The sequence of S10 and S11 may be interchanged, or S10 and S11 may be performed fully or partly in parallel.

If the request is received (S10="yes"), the creating means 20 creates the second connection (S20). In some embodiments, it may create the second connection only if the request is received while the user plane connectivity for the user equipment is provided via the first connection (S11="yes").

S20 may be performed before or after S11, or S20 may be performed fully or partly in parallel to S11.

If the user plane connectivity for the user equipment is provided via the first connection (S11="yes") and the second connection is created (S20), the inhibiting means 30 inhibits transmitting of user plane data on the second connection from the creating of the second connection until a predefined event happens (S30).

Figure 8:
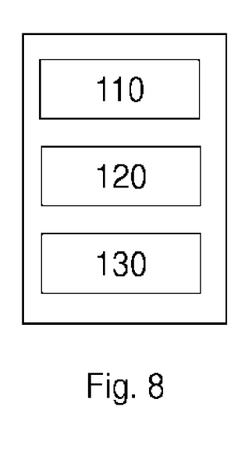
FIG. 8 shows an apparatus according to an embodiment of the invention.
Figure 9:
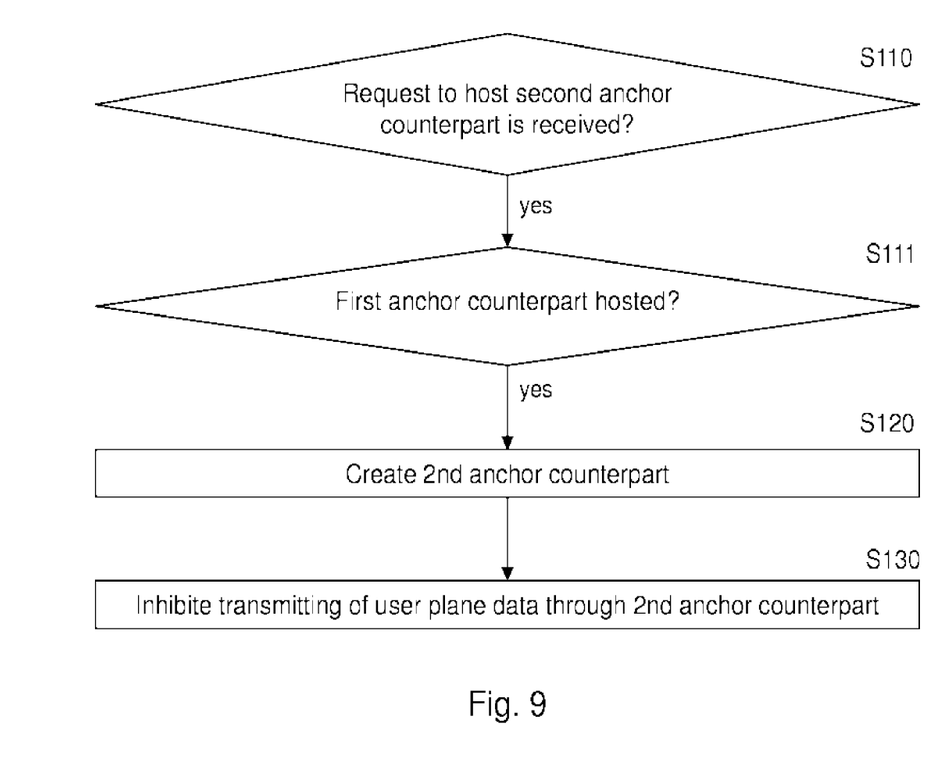
FIG. 9 shows a method according to an embodiment of the invention.

FIG. 8 shows an apparatus according to an embodiment of the invention. The apparatus may be a UE or an element thereof such as a control entity. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises supervising means 110, creating means 120, and inhibiting means 130. The supervising means 110, creating means 120, and inhibiting means 130 may be a supervising processor, creating processor, and inhibiting processor, respectively.

The supervising means 110 supervises if a request to host a second anchor counterpart is received (S110). The second anchor counterpart is for providing user plane connectivity via a second anchor entity. Furthermore, the supervising means 110 monitors if a first anchor counterpart for providing the user plane connectivity via a first anchor entity is hosted (S111). The first anchor identity is identified differently from the second anchor identity.

The sequence of S110 and S111 may be interchanged, or S110 and S111 may be performed fully or partly in parallel.

If the request is received (S110=yes), the creating means 120 creates the second anchor counterpart (S120). In some embodiments, it may create the second connection only if the request is received while the first anchor counterpart is hosted (S11="yes").

S120 may be performed before or after S111, or S120 may be performed fully or partly in parallel to S111.

If the first anchor counterpart is hosted (S111="yes") and the second anchor part is created (S120), the inhibiting means 130 inhibits transmitting of user plane data through the second anchor counterpart from the creating of the second anchor counterpart until a predefined event happens (S130).

Figure 10:
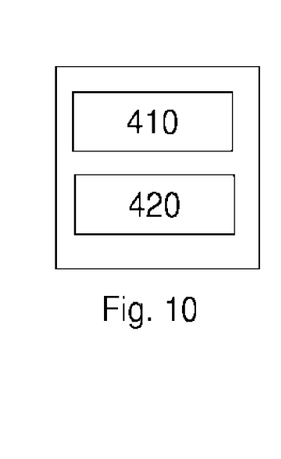
FIG. 10 shows an apparatus according to an embodiment of the invention.

FIG. 10 shows an apparatus according to an embodiment of the invention. The apparatus comprises at least one processor 410, at least one memory 420 including computer program code, and the at least one processor 410, with the at least one memory 420 and the computer program code, being arranged to cause the apparatus to at least perform at least one of the methods according to FIGS. 7 and 9.

Embodiments of the invention are described for a case where the UE is connected to the anchor via plural links and respective access points. However, in some embodiments, the UE is connected to the anchor via only one link and a corresponding access point.

In some embodiments, the old anchor point is torn down after the relocation, i.e., after the new anchor point took over the functionality of the old anchor point. However, in some embodiments of the invention, the old anchor point may not be torn down. Thus, in case the UE moves back into the area of the old anchor point, the anchor relocation process may be performed even faster.

In some embodiments, it is checked, after the preparation phase and before switchover takes place, if the second (new) anchor location (anchor 2) is still an optimal anchor location. Namely, the UE may have moved back into the area where the old anchor location (anchor 1) is the optimal anchor location. In this case, switchover to anchor 2 may not take place although it has been prepared. Anchor 2 and its counterpart in the UE may be torn down or maintained, depending on implementation.

In some of these embodiments, it may turn out that a third anchor location (anchor 3) different from the first and second anchor location is optimal, when the check after the preparation phase is made. In these embodiments, an anchor relocation to anchor 3 may be prepared instead of a switchover to anchor 2. Anchor 2 and its counterpart in the UE may be torn down or may be maintained, depending on implementation. If anchor 2 and its counterpart are maintained, the maximum number of simultaneously operational anchors may be limited to e.g. 3, or 4, or 5 etc. If the limit is reached, one of the simultaneously operational anchors on which user plane data are not sent may be torn down before an anchor relocation to a further anchor is prepared.

Each of the anchors (anchor entities) may be embodied as a separate hardware, or some or all of them may be embodied in a hardware joint with one or more of the access points, or some or all of them may be embodied in a hardware joint with the gateway.

Each of the anchors may be at a separate location, or some or all of them may be at a same location as one of the access points or the gateway.

Embodiments of the invention may be employed in a 3GPP network such as LTE or LTE-A, or in a 5G network. They may be employed also in other communication networks such as CDMA, EDGE, UTRAN networks, etc.

A user equipment may be e.g. a mobile phone, a smart phone, a PDA, a laptop, a tablet PC, a wearable, a machine-to-machine device, or any other device which may be connected to the respective mobile network. If not otherwise indicated or made clear from the context, a UE is considered to include the meaning of a terminal for a user (typically a subscriber of the mobile network) and the meaning of a terminal without a user such as a machine-to-machine device.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a gateway, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a UE, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code, wherein the at least one processor, with the at least one memory and the computer program code, are configured to cause the apparatus to perform at least:
setting up a second connection, and inhibiting transmitting of user plane data on the second connection until completion of the setting up the second connection based on user plane connectivity for a user equipment is provided via a first connection through a first anchor entity in addition to a request to provide user plane connectivity for the user equipment via the second connection through a second anchor entity is received, wherein the first anchor entity and the second anchor entity are differently indentified;
and
sequentially numbering packet data units of the user plane data to be transmitted to the user equipment on the second connection, subsequently and transmitting the user plane data to the user equipment on the second connection such that a first packet data unit of the user plane data transmitted on the second connection is after transmission of the user plane data on the first connection is inhibited, the first packet data unit being a direct numerical successor of a last packet data unit of the user plane data transmitted on the first connection before the transmission of user plane data on the first connection is inhibited.

2. The apparatus according to claim 1, wherein the at least one memory and the computer program code are configured to cause the apparatus to further perform
ceasing the inhibiting transmitting of the user plane data on the second connection after the completion of setting up the second connection; and
inhibiting transmission of the user plane data on the first connection after the completion of setting up the second connection.

3. The apparatus according to claim 1, wherein the at least one memory and the computer program code are configured to cause the apparatus to further perform
providing the user plane connectivity for the user equipment via the first connection at least until the completion of setting up the second connection.

4. The apparatus according to claim 1, wherein the at least one memory and the computer program code are configured to cause the apparatus to further perform
indicating, to the user equipment, after the completion of setting up the second connection, that the user plane data are transmitted via the second connection.

5. The apparatus according to claim 1, wherein the at least one memory and the computer program code are configured to cause the apparatus to further perform
tearing down the first connection at a time when the transmitting of the user plane data on the first connection is inhibited.

6. A method, comprising:
creating a second connection, and inhibiting transmitting of user plane data on the second connection until completion of setting up the second connection, when user plane connectivity for a user equipment is provided via a first connection through a first anchor entity and when a request to provide user plane connectivity for the user equipment via the second connection through a second anchor entity is received, wherein the first anchor entity and the second anchor entity are differently identified;
and
sequentially numbering packet data units of the user plane data transmitted to the user equipment on the second connection, such that a first packet data unit of the user plane data is transmitted on the second connection after a transmission of user plane data on the first connection is inhibited, the first packet data unit being a direct successor of a last packet data unit of the user plane data transmitted on the first connection before the transmitting on the first connection is inhibited, wherein packet data units of the user plane data transmitted to the user equipment on the first connection are numbered sequentially.

7. The method according to claim 6, further comprising:
checking if the completion of setting up the second connection happens;
ceasing the inhibiting of the transmitting of the user plane data on the second connection if the completion of setting up the second connection happens; and
inhibiting transmitting the user plane data on the first connection if the completion of setting up the second connection happens.

8. The method according to claim 6, further comprising:
providing the user plane connectivity for the user equipment via the first connection at least until the completion of setting up the second connection happens.

9. The method according to claim 6, further comprising:
indicating to the user equipment, if the completion of setting up the second connection happens, that the user plane data are transmitted via the second connection.

10. The method according to claim 6, further comprising:
tearing down the first connection at a time when the transmitting of the user plane data on the first connection is inhibited.

* * * * *